Apr. 3, 1923.

J. BARNES 1,450,784

BUILDING BLOCK

Filed Feb. 8, 1922

INVENTOR
James Barnes
by William B. Wharton
his attorney

Patented Apr. 3, 1923.

1,450,784

UNITED STATES PATENT OFFICE.

JAMES BARNES, OF NEW KENSINGTON, PENNSYLVANIA.

BUILDING BLOCK.

Application filed February 8, 1922. Serial No. 534,838.

*To all whom it may concern:*

Be it known that I, JAMES BARNES, a citizen of the United States, residing at New Kensington, in the county of Westmoreland and State of Pennsylvania, have invented a new and useful Improvement in a Building Block, of which the following is a specification.

This invention relates to a building block, brick, tile, or the like.

It is highly advantageous to secure to one or more faces of a block of cementitious material a facing plate of dense waterproof material, preferably a plate or sheet of glass or other vitreous material. The addition of such facing to the block prevents absorption of moisture by the block and presents a smooth and highly finished appearance. It is difficult, however, to secure a glassy facing to a cementitious block, because in practicing no roughening of the attaching surface of the glass has been found to provide sufficient anchorage to secure the glass firmly to the block.

The object of the invention is to secure a sheet or plate of glass or other vitreous material to a cementitious block, to form a facing therefor, in such manner that there is no likelihood of dislodgment of the facing sheet or plate.

Figure 1:
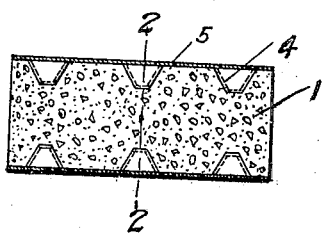
Figure 2:
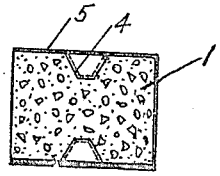
Figure 3:
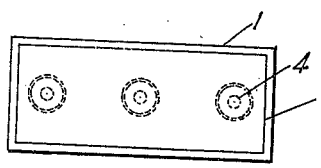
Figure 4:
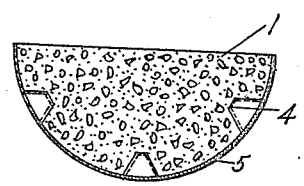
Figure 5:
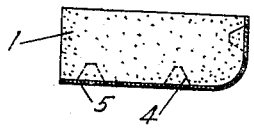
Figure 6:
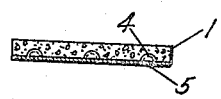
Figure 7:
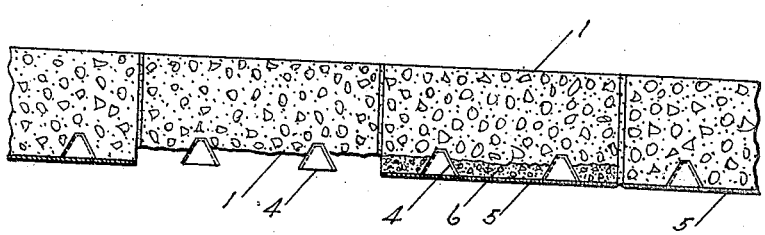

In the accompanying drawings Figure 1 is a longitudinal section through a building block having a plate or sheet of glass or the like secured to two faces thereof; Figure 2 is a cross section through such block on the line 2—2 Figure 1; Figure 3 is a plan view of the block with the glass facing omitted; Figure 4 is a horizontal section through a block constructed in accordance with the present invention and designed particularly for use in building up columns; Figure 5 is a horizontal section through a special corner block; Figure 6 is a longitudinal section through a tile or similar relatively flat article embodying the principle of the present invention; and Figure 7 is a horizontal section through a wall formed of blocks constructed in accordance with the present invention, showing the manner in which a block may be repaired should the facing of the block be broken.

The fundamental principle of the present invention resides in the formation of a vacuum in the cementitious material of the block or the like while it is moist and pressing the sheet or plate of glass to a face of the block in such position that the vacuum is maintained and the glass held firmly in place thereby.

The body 1 of the block is formed of cementitious material such as cement and sand, cement and ashes, cement and gravel, or other composition of like nature. Imbedded in this material are vacuum cups 4 with their open ends substantially flush with the face of the block. On the block, in contact with the face thereof and also in contact with the open ends of the cups, is a sheet or plate 5 of glass or other dense material; this sheet or plate 5 being held to the face of the block by the vacuum existing within the cups 4.

The vacuum within the cups 4 is produced by pressing the sheet or plate against the face of the block and the open ends of the cups while the cementitious material of the blocks is in a moist condition.

The rectangular blocks illustrated in Figures 1 and 2 of the drawings are shown with facing plates on two of the faces thereof. It will readily be understood, however, that for many purposes, as for example for either the interior or exterior surface of the walls of buildings, it is sufficient to provide one face of a rectangular block with the facing plate. For certain other uses more than two faces of a rectangular block may be faced with equally good results.

The cups employed are preferably of glass and are preferably tapered as shown in order that they may not occupy a large volume within the block. It will be understood, however, that means of any desired shape and material may be employed, provided only that they serve to create and retain the necessary vacuum for holding the facing in position during molding of the block and after drying thereof.

Figures 4, 5, and 6 of the drawings show the adaptation of the present invention to blocks of various forms, and serve to illustrate the adaptability of the principle involved.

Figure 7 of the drawing illustrates the repair of a block should the facing thereof be broken after the block is laid in a wall. In such event it is not necessary that the entire block be chipped out. As shown, a cavity may be chipped in the block 1, and filled with moist cementitious material 6 to a point level with the open ends of the cups 4. The new plate or sheet of glass 5 may then readily be pressed into position on the block, and because of the moisture of the added material a vacuum for holding such sheet or plate in position is formed in the cups 4.

In order to furnish an ornamental block for building purposes the plate or sheet of glass used as a facing is desirably colored. This may be done by the use of glass having coloring matter in the body thereof, but is preferably by painting the side of the glass which is in contact with the cementitious material of the block.

As numerous changes may be made upon the block illustrated and described without departing from the spirit of the invention the scope of the invention is to be restricted only by the limitations contained in the appended claims.

What I claim is:

1. A building block or the like comprising a body of cementitious material, a vacuum cup imbedded in said block and opening at a face thereof, and a facing of dense material on the face of the block and lying against the open end of the cup.

2. A building block or the like comprising a body of cementitious material having therein a vacuum space opening at a face thereof, and a facing of dense material lying on the face of the block and closing the open end of the vacuum space therein.

3. A building block or the like comprising a body of cementitious material, a vacuum cup imbedded in said block and opening at a face thereof, and a glass facing on the face of the block and lying against the open end of the cup.

4. A building block or the like comprising a body of cementitious material having therein a vacuum space opening at a face thereof, and a glass facing lying on the face of the block and closing the outer end of the vacuum space therein.

5. A building block or the like comprising a body of cementitious material, a vacuum cup imbedded in said block and opening at a face thereof, and a facing of pigmented glass on the face of the block and lying against the open end of the cup.

6. A building block or the like comprising a body of cementitious material having therein a vacuum space opening at a face thereof, and a facing of pigmented glass lying on the face of the block and closing the outer end of the vacuum space therein.

In witness whereof, I hereunto set my hand.

JAMES BARNES.

Witnesses:
 IDA KENNEDY,
 E. B. WALTERS.